United States Patent [19]
Urbansky

[11] Patent Number: 5,263,056
[45] Date of Patent: Nov. 16, 1993

[54] JUSTIFICATION DECISION CIRCUIT FOR AN ARRANGEMENT FOR BIT RATE ADJUSTMENT

[75] Inventor: Ralph Urbansky, Schwaig, Fed. Rep. of Germany

[73] Assignee: U.S. Philips Corporation, New York, N.Y.

[21] Appl. No.: 751,365

[22] Filed: Aug. 29, 1991

[30] Foreign Application Priority Data

Sep. 4, 1990 [DE] Fed. Rep. of Germany ....... 4027967

[51] Int. Cl.⁵ .......................... H04L 7/00; H04L 25/36
[52] U.S. Cl. ..................................... 375/112; 370/102; 375/118
[58] Field of Search ................ 375/118, 112; 370/102, 370/105.1

[56] References Cited

U.S. PATENT DOCUMENTS

| | | | |
|---|---|---|---|
| 4,941,156 | 7/1990 | Stern et al. | 375/118 |
| 5,119,406 | 6/1992 | Kramer | 375/118 |
| 5,132,970 | 7/1992 | Urbansky | 375/112 X |

FOREIGN PATENT DOCUMENTS

| | | |
|---|---|---|
| 3920391 | 1/1991 | Fed. Rep. of Germany . |
| 3922897 | 1/1991 | Fed. Rep. of Germany . |
| 3942883 | 6/1991 | Fed. Rep. of Germany . |
| 3942885 | 6/1991 | Fed. Rep. of Germany . |

*Primary Examiner*—Curtis Kuntz
*Assistant Examiner*—Tesfaldet Bocure
*Attorney, Agent, or Firm*—David R. Treacy

[57] ABSTRACT

A single signal is formed from two plesiochronous signals. The first signal's data are written in parallel in groups of n bits each. Writing and reading are controlled by respective counters, whose counts are also provided to a subtractor. A control loop for bit rate justification is formed by the subtractor, a controller and the read counter. A track counter counts the stuffed bits modulo n, and stops the read counter for one clock period after each n stuffed bits. The mean value of the subtractor output and the count of the track counter are set off against each other, and their result is used for justification formation and a preparation signal for incrementing the track counter.

10 Claims, 3 Drawing Sheets

JUSTIFICATION DECISION CIRCUIT FOR AN ARRANGEMENT FOR BIT RATE ADJUSTMENT

BACKGROUND OF THE INVENTION

The invention relates to a justification decision circuit for a circuit arrangement for bit rate adjustment of two signals, the circuit arrangement comprising an elastic store in which the data of a first signal can be written in parallel in groups of n bits each (n≧1) and which elastic store is followed by a selection matrix, in that the arrangement for bit rate adjustment comprises a write counter for controlling the writing operation and a read counter for controlling the reading operation, in that the justification decision circuit comprises a subtractor for forming the difference between the counts and in that the subtractor, a controller and the read counter form a control loop.

A justification decision circuit having the above characteristic features is known from DE-A 39 22 897, to which U.S. Pat. No. 5,132,970 corresponds. Such a circuit arrangement is necessary in information transmission technology, for example, for plesiochronous multiplexers which combine plesiochronous signals. Two binary signals are called plesiochronous when their bit rates are nominally identical but may in fact differ from the nominal value within a given tolerance. Before plesiochronous signals are combined by a plesiochronous multiplexer, they are all to be brought to the same bit rate which (with the so-called positive justification technique) is higher than the bit rates the individual plesiochronous signals have. This bit rate difference is equalized, for example, in that so-called stuff bits are inserted from time to obtain a signal having a higher bit rate. The signal having the higher bit rate is to be structured in frames so that such stuff bits can again be removed after demultiplexing. Frames especially considered in this context are the so-called Synchronous Transport Modules STM-N (cf. for this purpose CCITT Recommendations G707, G708, G709). Such a frame is partitioned into rows and each individual row is structured in bytes. These frames contain justification locations for variable stuff bits in addition to justification locations for so-called fixed stuff bits. The justification locations for fixed stuff bits are always to accommodate fixed stuff bits, whereas the locations for the variable stuff bits are occupied either with an information bit or a stuff bit according to the decision of the justification decision circuit.

In the prior-art circuit arrangement the input signal is converted by a serial-to-parallel converter into eight (n=8) parallel bits—thus in bytes—and written into an elastic store byte by byte. The following embodiments are restricted for simplicity to the case where n=8, because the expert will be able to translate the other embodiments to the case where n=8. Both the writing operations and the reading operations are controlled by counters (write or read counters), which are timed by byte clocks. It is the object of serial-to-parallel conversion to execute a maximum number of components of the overall arrangement in power saving CMOS technology.

The problem of inserting stuff bits at predetermined locations in a parallel bit stream of eight parallel bits, is solved in the prior-art circuit arrangement by means of a controllable selection matrix. The exact description of the selection matrix is to be found in, for example, DE-A 39 20 391, to which U.S. patent application Ser. No. 07/935,149 corresponds.

A further problem occurring in the prior-art circuit is that the variable stuff bits are situated in such a way that they are distributed as uniformly as possible over the signal having the higher bit rate. If this is not accomplished, a non-uniform distribution of the bits leads to low-frequency jitter during demultiplexing. This jitter can no longer be eliminated with simple means. A uniform distribution of the stuff bits is difficult inasmuch as the subtractor produces the phase time difference between write and read counters (this time difference is understood to be the period of time the read counter needs to get from the count of the write counter to its own actual count) with an accuracy of only byte clock periods and the uniform distribution of the stuff bits requires that this difference is known with an accuracy of one bit clock period. A time standard is in this context a byte clock period or a bit clock period respectively, of the signal having the higher bit rate. For brevity byte or bit-accurate phase differences will be referred to in this connection.

The problem of uniformly stuffing single bits is solved in the prior-art arrangement by means of a controller with an integrating behaviour, which is included in a control loop comprising the subtractor and the read counter. In this arrangement the low-pass behaviour of the control loop leads to a time-dependent interpolation of the byte-accurate phase difference. A compromise can be found between the quality of the interpolation which requires a long time constant and a favourable locking behaviour or dynamic behaviour of this control loop.

SUMMARY OF THE INVENTION

It is an object of the invention to provide a controller for the arrangement mentioned in the opening paragraph, which provides a better locking behaviour for the associated control loop and at the same time allows a bit-accurate indication of the phase difference.

This object is achieved in that the controller
a) comprises a mean value determining circuit for determining, over a predetermined time interval, a mean value of the output signal of the subtractor,
b) comprises a track counter for controlling the output matrix in response to the track count, for counting modulo n the stuffed bits, and for stopping the read counter for one clock period each time after n stuffed bits, and
c) comprises means for offsetting the mean value or the magnitude proportional thereto against the count of the track counter and for using the result of the offset as justification information and as a preparation signal for incrementing the track counter.

The output signal of the subtractor is scaled so that it denotes the deviations of the count difference or the phase difference from their nominal values, accurate to one byte (again only n=8 is taken into account) (for a further description of the subtractor cf., for example, DE-A 39 42 883, to which U.S. patent application Ser. No. 07/628,799 corresponds). When the arithmetic mean of all count differences is determined, the digits after the decimal point—thus the fractional parts of the byte—denote the number of bits by which the phase time difference has deviated on average from the nominal value during the predetermined time interval.

However, this mean value is a nominal mean value of the phase time difference inasmuch as the bits individually stuffed by means of the selection matrix and counted modulo 8 in the track counter make themselves felt when the read counter is in operation, only when the number of bits is a multiple of 8; the read counter is then stopped for one byte clock period. On the other hand, they are taken into account purely for computational purposes in that they are set off against the nominal mean value.

In an embodiment of the invention the justification decision circuit is characterized in that the justification decision circuit comprises a multiplier or a table stored in a read-only memory for transforming the count of the track counter into a magnitude comparable to the mean value; comparator for comparing the transformed count with the mean value or with the magnitude proportional thereto; and a register for storing the output signal. In this manner the mean value of the stuffed bits can be compared by a comparator with the mean (nominal) phase time difference produced by the mean value determining circuit. The result of this comparison now determines whether a further bit is to be stuffed or not on the next occasion.

In a further arrangement of the invention, the justification decision circuit is characterized in that the mean value determining circuit includes at least one additional input for at least one digit after the decimal point and in that the inputs for the digits after the decimal point are connected to the outputs for the count of the track counter and in that a register is provided for taking over at least the most significant bit of the mean value determining circuit after the predetermined time interval has ended. If these outputs are connected to the inputs for the digits after the decimal point of the mean value determining circuit, this denotes that the number of bits stuffed thus far are added to the nominal phase time difference converted into bytes. With the digits before and after the decimal point the mean value is determined as before, whose amount is the decisive factor for stuffing a bit on the next occasion or not.

The adding together of the number of stuffed bits as digits after the decimal point assumes that the subtractor subtracts the read count from the write count. In this case with the rapidly rising read count the (nominal) phase time difference becomes negative. However, since the stuffed bits have a shortening effect on the phase time difference, they are to be added as a positive contribution.

The invention will be further explained with reference to the drawing.

DESCRIPTION OF THE PREFERRED EMBODIMENT

Figure 1:
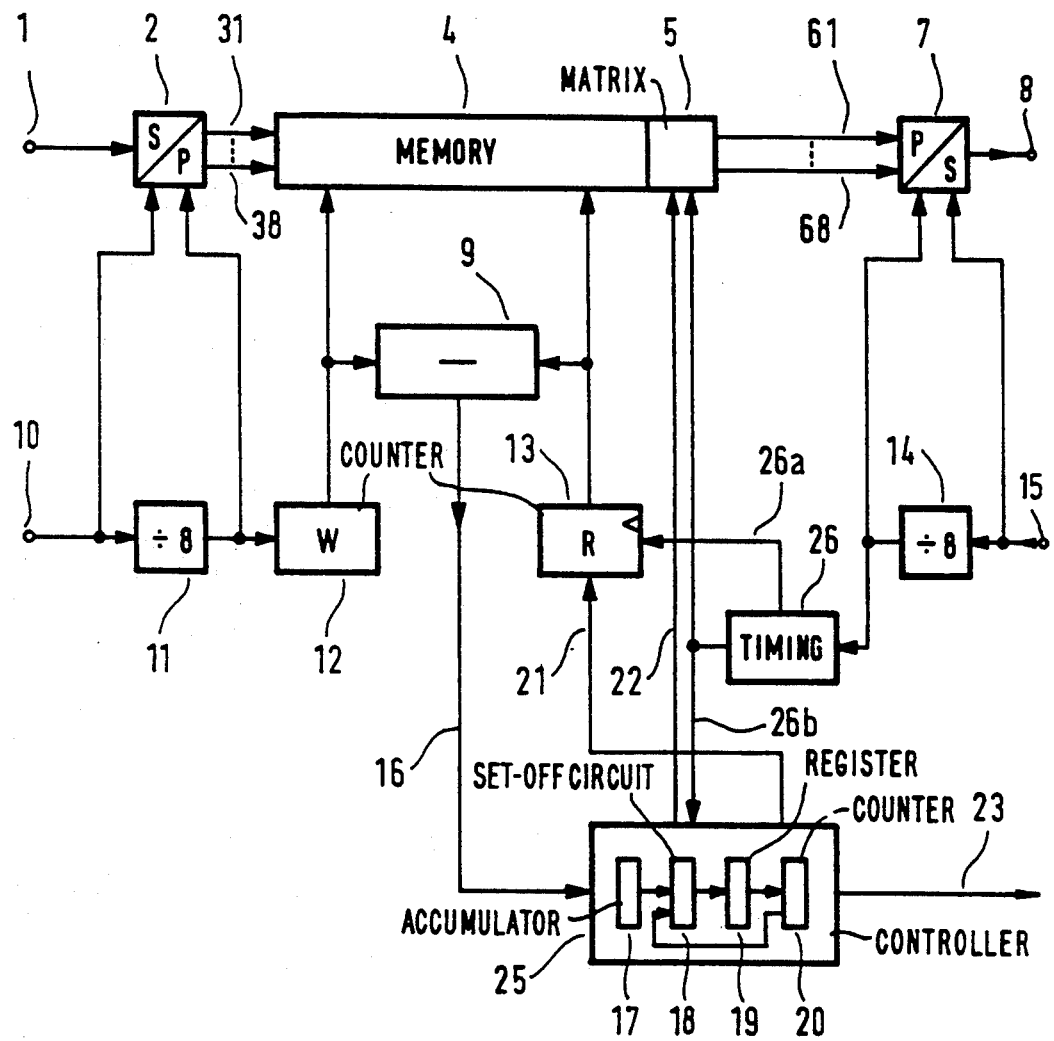
FIG. 1 shows the basic circuit diagram of an arrangement for bit rate adjustment comprising a justification decision circuit according to the invention.

In FIG. 1 a first binary signal is available at a terminal 1 with a nominal bit rate of 139.264 Mbit/s and a frame-structured second binary signal is available at an output terminal 8 with a nominal bit rate of 155.52 Mbit/s. The second binary signal contains stuff bits, stuff information bits as well as further auxiliary information bits in addition to all the bits of the first signal. The frame is the so-called Synchronous Transport Module STM-1 (cf. for this purpose, the above-mentioned information on this item). The structure with which the 139.264 Mbit/s signal is accommodated in a frame row is given by FIG. 5.3/G.09 of the CCITT Recommendation G709.

The bit clock of the first signal is present at a terminal 10. This clock is reduced by a first divider 11 at the ratio of 1:8 (n=8). The reduced clock—to be termed write clock hereinafter—has a pulse recurrence rate of 17.408 MHz. In the present example the integer variable n has generally the value of 8.

A serial-to-parallel converter 2 is supplied with the write clock and the original bit clock pulses. This converter converts eight serial bits of the first signal into eight parallel bits which are transported over lines 31 to 38 to eight write inputs of a buffer 4 (elastic buffer). Bits with a recurrence rate of 17.408 MHz present on the lines 31 to 38 so that all building blocks—except for one parallel-to-serial converter 7 on the output side and one frequency divider 14 on the output side—are structured in low-loss CMOS technology.

A first address counter 12—to be termed write counter hereinafter—is incremented with the write count. This counter 12 cyclically produces write addresses for the eight-bit-wide buffer 4. The first signal is stored byte-by-byte in the buffer 4 at the write addresses produced by the write counter 12. The bit clock of the second binary signal, which is available at a terminal 15, is led to the second divider 14 which also reduces this clock frequency at the ratio of 1:8. This reduced clock having a pulse sequence of 19.44 mbit/s—to be termed read clock hereinafter—together with the bit clock available at terminal 15 time the parallel-to-serial converter 7. The converter 7 converts the parallel processed first signal into the serial second signal with a bit rate of 155.52 Mbit/s and transports same to an output terminal 8. The read clock feeds a sequencer 26 consisting of a counter and a connected decoder. The decoder decodes the count of the counter and produces, at predetermined counts, pulses which are used for marking specific bytes within the STM-1 frame or within a row. Sequencers of this type are known to those of ordinary skill in the art (cf. for example, DE 39 42 883 cited above or DE 39 42 885, to which U.S. patent application Ser. No. 07/628,793 corresponds). Therefore, a more precise description of the sequencer 26 can be dispensed with in this document.

Pulses of the sequencer 26 are applied to a read counter 13 over a line 26a and to a selection matrix 5 and a controller 25 over a line 26b. These pulses are fed to the preparation inputs of said building blocks and thus ensure that their functions are performed in time. The count clock for the read counter is rendered inoperative, for example, by means of the pulses of the sequencer 26, i.e., the counter is stopped. Consequently, a byte from the buffer memory is read out a second time and can later be overwritten with frame information signals by means of a multiplexer (not shown). The track shift to be effected by means of the selection matrix 5 can not be effected until the sequencer 26 transmits the pulse required for this purpose over the line 26b. The functions of the building blocks of the controller 25 are controlled in a similar manner as will become more evident hereinbelow.

The read clock is used by the address counter 13 for cyclically generating read addresses. For clarity, the timing of the read counter 13 is only denoted by the read clock; thus by the output signal of the divider 14. The same holds for building blocks to be mentioned hereinafter which are also timed with the read clock.

A comparison of the write addresses with the read addresses is made in a subtractor 9 which subtracts the count of the read counter from that of the write counter. Since the counters 12 and 13 operate with different clock frequencies, the subtractor 9 comprises a synchronization circuit which synchronizes the count of the counter 12 with the read clock. This synchronization circuit comprises a transcoder which converts the count of the counter 12 first into a one-step intermediate code (Gray code) and after a sampling with the read clock converts this count again into a code suitable for subtraction (e.g. the dual code). The code conversion leads to a zero difference when the buffer is half filled i.e. when there is a maximum distance between the addresses of the counters 12 and 13. This state of the buffer being half filled forms the nominal value of a controller which will be further discussed hereinbelow. A more accurate description of the subtractor is to be found in DE-A-39 42 883 already cited hereinbefore.

The nominal value is adhered to by means of a control circuit formed by the controller 25, the read counter 13 and the subtractor 9. Because the read clock is the faster clock of the two, the read counter 13 will be stopped from time to time under the control of the sequencer 26 so that its count virtually corresponds to the count of the write counter 12. When the difference between write and read counts has been negative for a rather long period of time, a so-called variable stuff bit is inserted at a given location in the second signal with the aid of the selection matrix 5 as discussed hereinbefore.

By sending a pulse (count of the track counter 20) over the three-wire line 22 the insertion of a (variable) stuff bit is demanded, and by sending another pulse over the line 26b the selection matrix 5 is brought to a state in which a bit is repeated over a predetermined path of eight parallel lines and co-transmitted as a stuff bit (further details on the selection matrix: cf. DE-A-39 20 391 quoted above).

The controller 25 itself—which could also be considered a justification decision circuit in a narrower sense—consists of a mean value determining circuit formed here by accumulator 17—a track counter 20 which counts the stuffed bits modulo 8, means 18 with which the count of the track counter 20 is set off against the output signal of the accumulator 17, and a register 19 in which the result of this offset is stored. The further processing of this result consists, on one hand, of sending a signal as justification information over a line 23 to a multiplexer (not shown), which multiplexer gives the justification information bits places in response to the justification information and, on the other hand, of incrementing the track counter 20.

Figure 2:
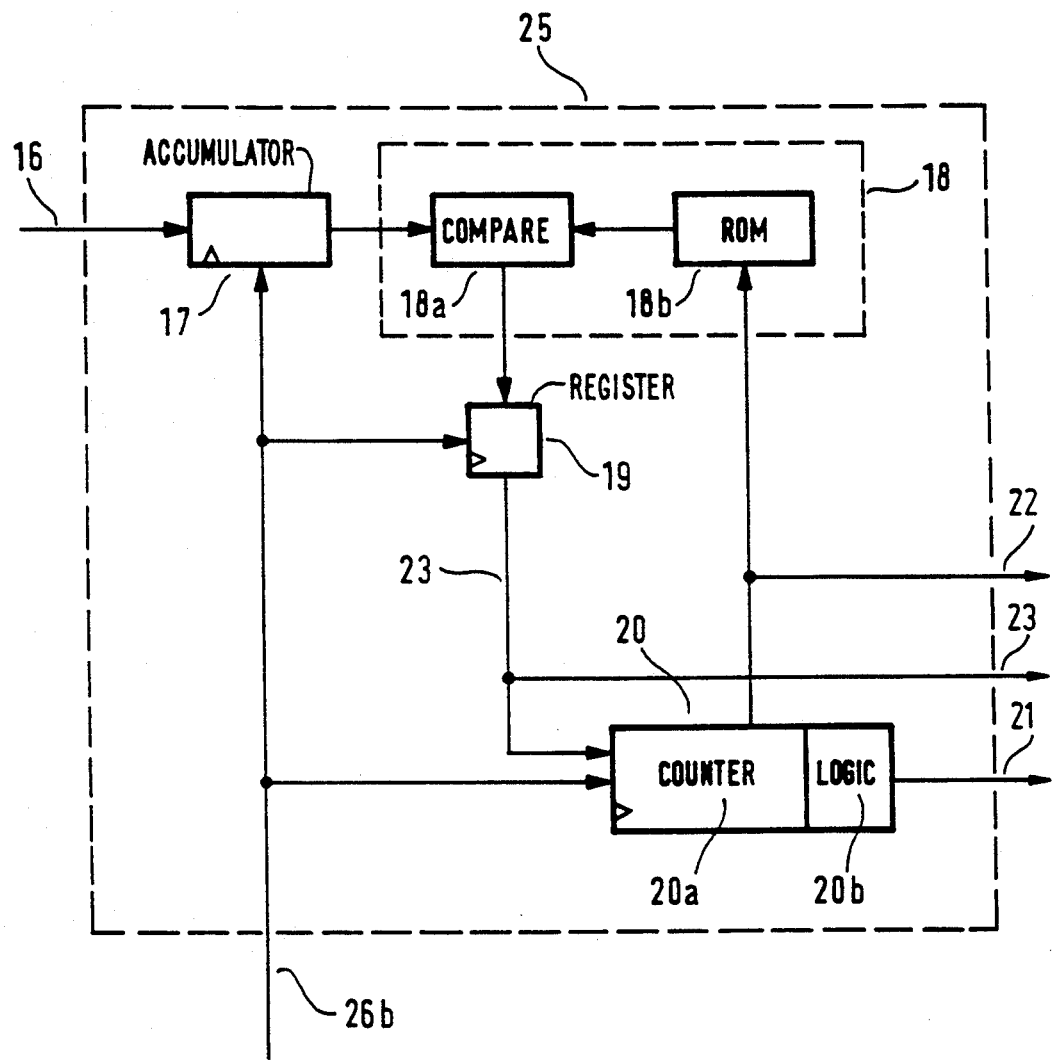
FIG. 2 shows a first exemplary embodiment for a controller according to the invention.

A first embodiment of the controller 25 is shown in FIG. 2. The arrangement of the represented embodiment of the controller 25 in a circuit structure shown in FIG. 1 is made possible without any problem in that the outgoing and incoming lines of the controller 25 have the same reference characters as the lines shown in FIG. 1. Building blocks forming a function unit in FIG. 1 have the same reference characters in FIG. 2 as in FIG. 1.

The accumulator 17 is a standard accumulator comprising an adder and a clocked register following this adder. The adder has first and second inputs. The data on the line 16 are applied to the first input, whereas the output of the clocked register is fed back to the second input of the adder. The accumulator is timed with the read clock. When a row pulse occurs on the line 26b, the contents of the accumulator are erased when the internal feedback is opened and when a zero is applied to the second input.

In the present exemplary embodiment the mean value determining circuit 17, i.e. the accumulator 17, determines a value proportional to the arithmetical mean, that is to say, the sum of the output values of the subtractor 9. This sum consists of 270 terms because in an STM-1 frame a decision can be made per frame row which is 270 byte clock periods long whether the provided justification location is to be filled with a (variable) stuff bit or a data bit. In order to obtain the arithmetical mean, the above sum is to be divided by 270. This division, however, is omitted in this case and when the sum is set off against the already stuffed bits, a multiplication by the factor of 270 is taken into account as will be further explained hereinbelow.

The means for offsetting 18 comprise a comparator 18a which is supplied with the output signal of the accumulator 17 and compares the output data of a ROM 18b. The count of the track counter 20 is applied as an address to the ROM 18b over the three-wire line 22. With the aid of the tables stored in the ROM, the bits individually stuffed thus far (thus the count of the track counter 20) are converted into fractional portions of stuffed bytes, so that they are applied to the comparator 18a with comparable values. At the end of a row of an STM-1 frame, the result of the comparison is stored in register 19 which is timed with the read clock which clock is only activated when there is a pulse on the line 26b. A binary one is used as a result of the comparison when the sum of the input signals of the comparator 18a is smaller than zero and a binary zero when this sum is greater than or equal to zero. If a binary one is present in the register 19, a variable stuff bit will be inserted on the next occasion (by the multiplexer (not shown)). If a binary zero is present in the register 19, justification will not take place. The binary value stored in the register 19 is also applied to a first preparation input of the track counter 20. If justification is to take place, the signal at the first preparation input increments the track counter 20 by two when there is a row pulse on the line 26b at a second preparation input. If no justification is to take place, the counter will be incremented by only unity when there is a pulse at the second preparation input. This incrementing corresponds to inserting a fixed and a variable stuff bit into the second binary signal or inserting only the fixed stuff bit.

The counter 20 can be subdivided into two units, a counting unit 20a and a transmission logic 20b. The transmission logic produces a pulse over the line 21 when the counter exceeds the count 7, so that the read counter 13 is stopped for one clock period. Simultaneously, over a line (not shown), the selection matrix is brought to a state that avoids a one-byte-long information gap occurring in the second binary signal because the same byte is repeated.

Figure 3:
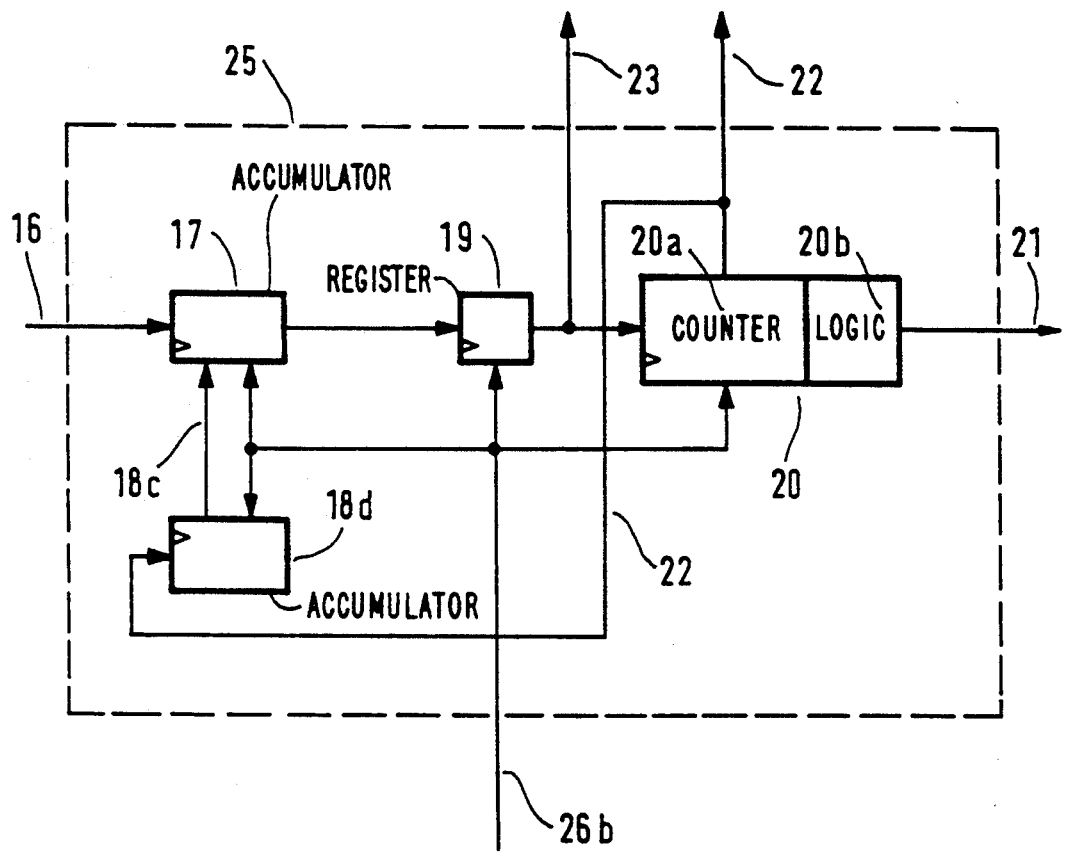
FIG. 3 shows a second exemplary embodiment for a controller according to the invention.

FIG. 3 shows a further variant of the controller 25. It is distinguished from the variant shown in FIG. 2 in that a different method of offsetting the mean value against the count of the track counter 20 is used. According to this method also other means are used, that is to say, a second accumulator 18d, which treats the count of the track counter 20 in exactly the same manner as it treats the output signal of the subtractor 9. The signals of the means for setting 18 are transmitted over a line 18c to the accumulator 17, that is to say, to the accumulator's least significant bit position. These measures are based on the following considerations: If the count of the write counter is subtracted from the count of the read counter by the subtractor 9, the mean value determining circuit 17 at the end of a row generates the mean number of bytes to be justified, provided that this mean value is negative. The number of bits already stuffed and expressed in bytes are to be set off against this mean value, that is to say, added together in numbers of bytes. This addition is performed by the accumulator 18d together with the transmission line 18c. The count of the track counter 20 is treated as fractional parts of bytes (digits after the decimal point), which are to be added to the output data of the subtractor 9. The accumulators 17 and 18d operate as a single accumulator which is erased after the end of a frame row by means of pulses over the line 26b and from whose contents only the sign is adopted in the register 19. Since only the sign is adopted, the division by 270 may be omitted also in this case because it leaves the sign unchanged.

The function of the described circuit can also be taken over completely or partly by an accordingly programmed computer. Making the program(s) is in the present case familiar to the expert because the overall circuit consists of only elementary digital building blocks and the software required for this purpose is known either from literature or is obvious therefrom.

References:
1) Tansky, T. R.: "11-byte program generates 2 billion pseudo-random bits". Electronics, Oct. 12 (1978), p. 148.
2) Fliege, N.: "Digitale Filter mit dem Signalprozessor 2920". Elektronik (1981), pp. 81 to 85 and pp. 89 to 94.
3) Müller, K. H.: "Echtzeitsimulation mit dem Analog Prozessor 2920". Elektronik (1981), pp. 95 to 98.
4) "Signal Processing Algorithms". Prentice-Hall., Inc., Englewood Cliffs, N.J. 07632.
5) Oberhofer, A.: "Zustandsregelung mit digitalen Filtern". Elektronik (1985), pp. 63 to 68.
6) Manuals of the Daisy Systems Corporation "Simulation Compilation". August 1988 and "Daisy Behavioral Language". September 1988.

The indication of the direction in which signals flow in the figures and the characterization of the individual function blocks by the operation affecting the signals are, for one of ordinary skill in the art equivalent to a flow chart with the present state of the simulation technique and the state of the higher programming languages (C, Fortran, Basic, DSPARC, DABL).

I claim:

1. A circuit for adjusting the bit rate of two plesiochronous signals, comprising:
   memory for storing data of a first signal in parallel in groups of n bits each,
   means for reading out the data stored in said groups and inserting stuff bits at predetermined locations,
   a write counter for controlling writing of said data in said memory,
   a read counter for controlling reading out of said memory, and
   a justification decision circuit for controlling said means for reading out, said justification decision circuit including a controller and a subtractor, said subtractor having an output which is the difference between the counts of the read and write counters,
   said subtractor, controller and read counter forming a control loop,
   characterized in that said controller comprises a mean value determining circuit for determining a mean value of said subtractor output, a track counter, and means for offsetting a magnitude value proportional to said mean value,
   said mean value determining circuit determining the mean value of the subtractor output over a predetermined time interval,
   said track counter being arranged for counting modulo n said stuffed bits, and providing a read stop signal for one clock period after each n stuffed bits,
   said controller further comprising means for stopping said read counter for one block period responsive to said read stop signal, and
   said mean for offsetting using the result of the offset as a preparation signal for incrementing the track counter.

2. A circuit as claimed in claim 1, characterized in that said magnitude value is said mean value.

3. A circuit as claimed in claim 2, characterized in that said mean value determining circuit and said means for offsetting together comprise:
   means for transforming the count of the track counter into a magnitude representing said mean value, and
   a comparator for comparing the transformed count with a magnitude value proportional to the mean value, and providing a comparator output, and
   said controller comprises a register for storing the comparator output.

4. A circuit as claimed in claim 2, characterized in that said means for offsetting has an input connected to an output of the track counter for receiving at least one digit representing a fractional part of a byte,
   said mean value determining circuit has an input connected to receive an output of said means for offsetting, for applying said output signal to the least significant bit position of the mean value determining circuit, and
   said controller comprises a register for storing at least the most significant bit of said mean value after said predetermined time interval has ended.

5. A circuit as claimed in claim 1, characterized in that said mean value determining circuit and said means for offsetting together comprise:
   means for transforming the count of the track counter into a magnitude representing said mean value, and
   a comparator for comparing the transformed count with a magnitude value proportional to the mean value, and providing a comparator output, and
   a controller comprises a register for storing the comparator output.

6. A circuit as claimed in claim 1, characterized in that said means for offsetting has an input connected to an output of the track counter for receiving at least one digit representing a frictional part of a byte,
   said mean value determining circuit has an input connected to received an output of said means for offsetting, for applying said output signal to the least significant bit position of the mean value determining circuit, and
   said controller comprises a register for storing at least the most significant bit of said mean value after said predetermined time interval has ended.

7. A method of adjusting the bit rate of two plesiochronous signals, comprising:
- storing data of a first signal in parallel in groups of n bits each in a memory,
- counting read bits and reading out the data stored in said groups and inserting stuff bits at predetermined locations according to a read count,
- counting write clock bits and controlling writing of said data in said memory according to a write count,
- forming a difference value which is the difference between said read and write counts, and
- responsive to a function of said difference value, controlling insertion of said stuff bits, characterized by the steps of:
- determining a mean value of said difference value over a predetermined time interval,
- counting modulo n the inserted stuff bits to form a track count, and providing a read stop signal for one clock period after each n stuffed bits,
- determining a magnitude value proportional to said mean value, and offsetting said magnitude value against said track count,
- stopping said read counter for one clock period responsive to said read stop signal, and
- using the result of the offset as a preparation signal for incrementing the modulo n count of said stuffed bits.

8. A method as claimed in claim 7, characterized in that said magnitude value is said mean value.

9. A method as claimed in claim 7, characterized in that said determined and offsetting steps together comprise:
- transforming the track count into a magnitude representing said mean value,
- comparing the transformed count with a magnitude value proportional to the mean value, and providing a comparison value, and storing the comparison value.

10. A method as claimed in claim 7, characterized in that the track count forms at least one digit representing a fractional part of a byte,
- said at least one digit is an input to the steps of determining and offsetting, and
- the method further comprises storing at least the most significant bit of said mean value after said predetermined time interval has ended.

* * * * *